United States Patent [19]

Himes

[11] Patent Number: 4,904,725

[45] Date of Patent: Feb. 27, 1990

[54] BLOCK COPOLYMERIC RUBBER COMPOSITIONS FOR SOLES

[75] Inventor: Glenn R. Himes, Houston, Tex.

[73] Assignee: Shell Oil Company, Houston, Tex.

[21] Appl. No.: 395,696

[22] Filed: Aug. 18, 1989

Related U.S. Application Data

[60] Division of Ser. No. 222,385, Jul. 21, 1988, Pat. No. 4,882,378, which is a continuation of Ser. No. 676,708, Nov. 30, 1984, abandoned.

[51] Int. Cl.$^4$ .................. C08K 5/00; C08K 3/00; A43B 13/04
[52] U.S. Cl. ..................... 524/505; 36/32 R
[58] Field of Search .............. 36/32 R; 524/505; 525/236, 237

[56] References Cited

U.S. PATENT DOCUMENTS

| | | | |
|---|---|---|---|
| Re. 28,236 | 11/1974 | Hendricks et al. | 36/2.5 R |
| 4,216,132 | 8/1980 | Zweig et al. | 260/33.6 |
| 4,219,627 | 8/1980 | Halasa et al. | 525/89 |
| 4,377,655 | 3/1983 | Himes | 524/313 |
| 4,423,190 | 12/1983 | Fukawa et al. | 525/98 |
| 4,495,323 | 1/1985 | Collins | 524/426 |
| 4,530,967 | 7/1985 | Shiraki et al. | 525/89 |

*Primary Examiner*—Christopher Henderson

[57] ABSTRACT

Unit soles having a high abrasion resistance are molded from a polymeric composition comprising radial (AB-)—$_x$—BA monoalkenyl arene/conjugated diene block copolymers, syndiotactic-1,2-polybutadiene, a hydrocarbon extending oil, and a filter.

2 Claims, No Drawings ial monoalkenyl arene-conjugated diene block copolymers, syndiotactic-1,2-polybutadiene, linear low density polyethylene (LLDPE), a hydrocarbon extending oil, and a filler.

2. Description of the Prior Art

The use of certain block copolymers and their compounds in a number of end-uses and especially footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of styrene-butadiene block copolymer, extending oil, polystyrene and possibly a filler.

For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of vulcanized rubber, injection molded poly(vinyl chloride) or leather. Especially desired is a rubberlike dull surface combined with unblemished smoothness.

One attempt to achieve a smooth look appearance is taught in U.S. Pat. No. 4,216,132. In the '132 patent, a mixture of linear and radial block copolymers and high density polyethylene are disclosed. While this polymeric composition resulted in relatively smooth appearance for unit soles, the surface was too shiny for certain shoe styles. Instead, what is required is a polymeric composition which results in unit soles having smooth, non-splayed, dull surface.

Another patent 4,377,655 described a mixture of linear and radial block copolymers and a styrene-acrylonitrile copolymer. U.S. Ser. No. 603,022 now U.S. Pat. No. 4,520,138 describes a blend of radial block copolymers, polybutadiene, polystyrene and resin.

SUMMARY OF THE INVENTION

The present invention deals with a polymeric composition which has particular utility in the injection molding of unit soles having high abrasion resistance. Specifically, the present invention is a polymeric composition comprising:

(a) 100 parts by weight of a block copolymer portion comprising
  (1) about 10% to 90% of one or more radial (AB—)$_x$—BA block copolymers where x is between 1 and 20, each block A being a monoalkenyl arene polymer having an average molecular weight between about 5,000 and 75,000, each block B being an elastomeric conjugated diene polymer having an average molecular weight between about 15,000 and about 300,000, and said blocks A comprise 8–50% by weight of each copolymer;
  (2) about 10% to 90% by weight of one or more radial (CD—)$_y$DC block copolymers where y is between 1 and 20, each block C being a monoalkenyl arene polymer having an average molecular weight between about 5,000 and 120,000, each block D being an elastomeric conjugated diene polymer having an average molecular weight between about 8,000 and about 60,000, and said blocks C comprise 60–90% by weight of each copolymer;
(b) about 0 to about 300 parts by weight of a syndiotactic 1,2-polybutadiene;
(c) about 0 to about 50 parts by weight of a linear low density polyethylene;
(d) about 0 to about 200 parts by weight of a hydrocarbon rubber extending oil; and
(e) about 0 to about 250 parts by weight of a large agglomerate size filler.

It has been found that a combination of a low styrene content styrene-butadiene block copolymer, a high styrene content styrene-butadiene block copolymer, syndiotactic-1,2-polybutadiene, linear low density polyethylene (LLDPE), silica and extending oil yields an injection moldable composition which gives high abrasion resistance and reasonable cost. The appearance is at least as attractive as vulcanized rubber (e.g., natural rubber or styrenebutadiene rubber) but this composition is more cheaply processed and completely recyclable. Invention is a "rubber look" TR unit sole compound which combines properties heretofore not possible with this type composition. Specifically, the composition comprises a very high loading of compounding ingredients and yet exhibits abrasion resistnce which is better than competitive compounds in the rubber look TR market. The composition has excellent molding qualities, including freedom from weld lines, a dull, uniform surface, and low energy requirement. It also has good adhesion and strength properties, low density and good economics.

The key to this invention is the use of high levels of block copolymer resin with a monoalkyl arene content greater than 60% (in combination with LLDPE and 1,2polybutadiene) with a particular rubber base polymer having a monoalkyl arene content of less than 50%.

Dullness results from 1,2 polybutadiene, which is partially crystalline and incompatible with the styrene-butadiene-styrene and the large agglomerate size (7.0μ) silica which, although moisture-bearing and hygroscopic, does not splay the surface of this composition as more conventional silicas do during injection molding. The level of each ingredient is important in achieving the desired appearance and good physical properties.

Prior art concepts employed polystyrene, poly(α-methylstyrene), high impact polystyrene (rubber-modified polystyrene) and the like to harden and stiffen Thermoplastic Rubber compounds. However, these resins imparted an undesirable shiny surface to injection molded unit soles. Polypropylenes have also been evaluated in compositions of this type. Although generally dull in appearance, such combinations usually exhibit delamination (easy separation of a surface layer) after injection molding of a unit sole.

For the purposes of this invention the type of filler used is not critical. Prior art compounds generally relied on fine particle (0.021μ) hydrated silica filler to impart dullness to Thermoplastic Rubber compounds. This type of dullness is inferior to that given by the subject invention because the surface is relatively rough, grainy and uneven in texture. The surface generated by fine particle hydrated silica is due to steam evolved at injection molding temperatures. The subject invention does not rely on evolution of a volatile component for surface dullness. The preferred filler, a large agglomerate size particle silica, does not splay Thermoplastic Rubber at injection molding temperatures (300°-380° F.). Other non-splaying fillers, including calcium carbonates, talcs, clays, some silicates, etc., are acceptable, however, large size particles give the best results.

DETAILED DESCRIPTION OF THE INVENTION

The block copolymer component of the present invention comprises a low monoalkenyl arene content polymer and a high monoalkenyl arene content polymer. The first polymer is present at between 10% and 90% of the block copolymer component and is a radial $(A-B-)_xB-A$ block copolymer where x is greater than 1. Preferably, x varies from 1 to 20, more preferably from about 2 to about 6. The A blocks comprise less than 50% of the polymer and are monoalkenyl arene polymer blocks and the B blocks are elastomeric conjugated diene polymer blocks. Typical linear block copolymers have the structure polystyrene-polybutadiene-polystyrene (SBS). A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The high monoalkenyl arene content block copolymer component is a radial $(C-D)_yD-C$ block copolymer where y is greater than 1, preferably from 1 to 20, most preferably from 2 to 6 as in the first block copolymer. The C blocks comprise greater than 60% of the polymer and are mono alkenyl arene polymer blocks. The D blocks are elastomeric conjugated diene polymer blocks. This block copolymer can be present at from 10 to 90% of the block copolymer component. In basic composition and structure the $(CD)_yDC$ block copolymers are the same as the $(AB)_xBA$ block copolymers, but may differ in molecular weight distribution and/or segmental molecular weights in the individual branches.

The average molecular weights of each of the blocks may be varied as desired. The monoalkenyl arene polymer blocks preferably have number average molecular weights between about 5,000 and about 120,000, more preferably between about 8,000 and about 80,000. The elastomeric conjugated diene polymer blocks preferably have number average molecular weights between about 8,000 and about 300,000, more preferably between about 10,000 and about 150,000. The average molecular weights of the polystyrene end blocks are determined by gel permeation chromatography, whereas the polystyrene content of the polymer is measured by infrared spectroscopy of the finished block polymer. The general type and preparation of these block copolymers are described in U.S. Pat. No. Re. 28,246, in U.S. Pat. No. 3,639,517 and in many other U.S. and foreign patents.

The syndiotactic 1,2-polybutadiene can be present in amounts from 0 to 300 phr (that is, parts per hundred parts of total monoalkenyl arene/conjugated diene block copolymer), preferably 5-200 phr and preferably 30-90 phr, and is important in a dull surface. The dulling effect is believed to result from the scattering of reflected light by the myriad of surfaces in the filler particles and the multiple interfaces around the incompatible 1,2-polybutadiene particles.

The 1,2-polybutadiene can have a molecular weight between about 75,000 and 200,000, preferably between 100,000 and 150,000 as determined by GPC. Crystallinity can range from 15% to 90%, preferably between 25% and 35%.

The linear low density polyethylenes are not critical in the present invention. However, LLDPE useful herein should have melt indices between about 0.1 and 30 and a density greater than about 0.89 grams per cubic centimeter ($g/cm^3$). Typical linear low density polyethylenes (LLDPE) have densities of around 0.89 to 0.94, a crystalline melting point of over about 100° C., and a molecular weight of between about 40,000 and 1,000,000 by GPC. Melt index is important in that it relates to the viscosity characteristics of the polyethylene.

The process by which these polyethylenes are prepared does not form a part of the present invention. They may, in fact, be prepared by any of the well-known methods such as those described in the book "Polyethylene" by Raff and Allison, Interscience Publishers (1956). See also the Kirk-Othmer Encyclopedia of Science and Technology, Volume 14, pages 242-282 (2nd ed. 1967).

The amount of polyethylene employed varies from about 0 phr (parts by weight per hundred parts by weight rubber, or block copolymer component as in this case) to about 150 phr, preferably between about 1.0 and about 30 phr.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX® oils, Nos. 310, 371 and 311 (which is a blend of 310 and 371). The amount of extending oil employed varies from about 0-200 phr, preferably from about 60-130 phr.

The fillers which may be used in the present compositions are well known in the art and include clay, talc, alumina, silica, titanium dioxide, and other pigments as well as certain dry fibrous fillers such as polyester or acrylic fibers. Preferred fillers include large agglomerate size amorphous silica or alumina. Agglomerate size may vary, however, 1 to 25 microns is preferred. In a most preferred embodiment, the filler is precipitated hydrated silica having a medium agglomerate size of 7 microns and an ultimate particle size of 0.021 micron. The amount of filler employed varies from 0–250 phr, preferably 10–50 phr.

Additional minor amounts of antioxidants, ultraviolet stabilizers and the like may also be added. Any stabilizers known in the art may be employed. Preferred phenolic stabilizers include tetrakis[methylene-(3',5'-di-tert-butyl-4'-hydroxyphenyl)propionate]methane available as Irganox 1010 from Ciba-Geigy or 1,3,5-trimethyl-2,3,6-tris[3,5-di-tert-butyl-4-hydroxybenzyl]benzene available from Ethyl Corporation as AO 330.

The components of this invention may be combined by processes known in the art including blending such as by extrusion, Banbury mixing or by dry-blending procedures. In the latter case, it is preferred that the block copolymer and other polymers be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end uses also are contemplated. These include, for example, automotive parts and wire cable coatings. Tubular products such as hoses and the like also are contemplated.

The use of the present compositions in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. The compositions also may be used in the manufacture of injection molded canvas shoe soles wherein the soling is directly injection molded onto the canvas upper which may be canvas or various natural and synthetic fibers, including leather, vinyl and polymeric materials. In some cases pre-coating of the upper with a primer is required to effect adhesion.

The invention is further illustrated by means of the following illustrative embodiments, which are given for the purpose of illustration alone and are not meant to limit the invention to the particular reactants and amounts disclosed.

ILLUSTRATIVE EMBODIMENTS

In the Illustrative Embodiment four compositions were prepared and their properties evaluated. Formulation #1 was the prior art preferred composition from U.S. Ser. No. 603,022 and was used as a control. Formulations 2, 3 and 4 were according to the present invention.

The individual components were mixed on a Banbury mixer at about 350° F. for a total mix time of about 3 minutes.

Samples of the various compositions were tested according to the following tests:

| Test | ASTM Standard Test Number |
|---|---|
| Shore A Hardness | D-2240 |
| Tinius Olsen Stiffness | D-747 |
| Taber Abrasion | D-1044 |
| Ross Cut Growth | D-1052 |
| Tensile, Elongation Set and Modulus | D-412 |
| Tear Strength | D-624 |

The formulations and test results are presented below in Tables I and II.

TABLE I

| | PHR Formulation | | | |
|---|---|---|---|---|
| | 1 | 2 | 3 | 4 |
| Block Copolymer #1 | 61.0 | 61.0 | — | — |
| Block Copolymer #2 | 39.0 | 39.0 | 45.0 | 45.0 |
| Block Copolymer #3 | — | 25.0 | 55.0 | 55.0 |
| Oil | 109 | 109 | 77.0 | 112.0 |
| 1,2-polybutadiene | 50.0 | 50.0 | 50.0 | 65.0 |
| Alpha-methylstyrene resin | 25.0 | — | — | — |
| Silica | 15.0 | 15.0 | 15.0 | 25.0 |
| Blowing Agent | 0.5 | 0.5 | 0.5 | — |
| Antioxidant | 0.35 | 0.35 | 0.35 | 0.35 |
| LLDPE | — | — | — | 5.0 |
| Total phr | 299.85 | 299.85 | 242.85 | 307.35 |

| Component | Description |
|---|---|
| Block Copolymer #1 | (S—B)$_{2.5}$—B—S 44% styrene MW = 215,000 |
| Block Copolymer #2 | (SB)$_{2.5}$—BS 30% styrene MW = 240,000 |
| Block Copolymer #3 | (SB)$_3$—BS 75% styrene MW = 200,000 |
| Oil | Hydrocarbon naphthenic rubber extending oil (SHELLFLEX 371, Shell Oil Co.) |
| Polybutadiene | MW = 100,000 + 29% crystallinity (JSR RB-830, Japan Synthetic Rubber) |
| Alpha methyl styrene | AMOCO 18-290, Amoco Chemicals Corp. |
| Silica | Precipitated hydrated amorphous silica (Lovel 29, agglomerate size 7μ) |
| Blowing agent | Celogen AZ 130; Uniroyal Chemicals |
| Antioxidant | Irganox 1010 (Ciba-Geigy) |
| LLDPE | PE UC 7149 Union Carbide density 0.934, melt flow index 4.0 |

TABLE II

| | 1 | 2 | 3 | 4 |
|---|---|---|---|---|
| Melt Flow (E), g/10 min. | 13 | 13 | 13.5 | 31 |
| Unit Sole Hardness, Shore A (inst.) | 60 | 60 | 67 | 58 |
| Comp. Molded Hardness, Shore A (10 sec.) | 55 | 55 | 62 | 53 |
| Sp. Gravity | 0.95 | 0.96 | 0.975 | 0.97 |
| Taber Abrasion, cm$^3$/kc | 0.78 | 0.58 | 0.38 | 0.49 |
| Tear Strength parallel/normal, pli | 120/120 | 130/130 | 150/150 | 110/110 |
| Ross Flex, kc to 500% | >3000 | >3000 | 2300 | 1200 |
| Tensile Strength, P/N, psi | 750/850 | 640/720 | 740/710 | 610/620 |
| Elongation, P/N, % | 720/810 | 640/730 | 600/680 | 590/600 |
| 300% Modulus, P/N, psi | 310/280 | 350/320 | 490/390 | 410/400 |
| Set, P/N, % | 40/50 | 40/45 | 70/60 | 75/70 |
| T.O. Stiffness, psi | 840 | 720 | 770 | 540 |
| Adhesion, pli | 57 | 60 | 68 | 53 |
| Type failure | Rubber tear | Rubber tear | Rubber tear | Rubber tear |

The abrasion and flow related shortcomings of conventional compounds were found to be improved markedly by the incorporation of high styrene content resin in the formulation. An example of the resin (manufactured by Phillips as K-Resin KR03) is a 75% styrene, block (S—B)$_{3-4}$ polymer having asymmetric segment lengths in the radial arms. The resin appears to be useful both as a substitute for alpha-methylstyrene resin and as a replacement for part of the block copolymer base polymer. Formulation #1 was used as a control.

Direct replacement of 25 phr of alpha-methylstyrene with the high styrene resin (block copolymer #3) produced an improvement in Taber abrasion from 0.78 to 0.58 cm$^3$/kc. Flow was essentially unaffected. (See formulation #2 in the Table II.) This usage alone would make the high styrene resin of interest at current material prices. When substituted for the base polymer (block copolymer #1) (formulation #3 in the Table II), Taber abrasion dropped to 0.38 cm$^3$/kc. (Small increases in 1,2-polybutadiene and silica loading were made to improve dullness.)

At this point unit sole hardness was too high (67 Shore A, compared to 57 target) and Shellflex 371 oil was added (35 phr increase). The resultant compound had a melt flow of 31 g/10 min., and a Taber abrasion of 0.49 cm$^3$/kc. Thus, this class of compound exhibits an unusual tolerance for oil as far as abrasion resistance is concerned. (See formulation #4 in the Table II.)

Five phr of LLDPE (Union Carbide 7149) was incorporated in formulation #4 to diminish weld lines.

What is claimed is:

1. A unit sole molded from a polymeric composition having high abrasion resistance and freedom from weld lines, said composition comprising:
   (a) 100 parts by weight of a block copolymer portion comprising
      (1) about 10% to 90% of one or more radial (AB—)$_x$—BA block copolymers where x is between 1 and 20, each block A being a monoalkenyl arene polymer having an average molecular weight between about 5,000 and 75,000, each block B being an elastomeric conjugated diene polymer having an average molecular weight between about 15,000 and about 300,000 and said blocks A comprise 8–50% by weight of each copolymer;
      (2) about 10% to 90% by weight of one or more radical (CD—)$_y$DC block copolymers where y is between 1 and 20, each block C being a monoalkenyl arene polymer having an average molecular weight between about 5,000 and 75,000, each block D being an elastomeric conjugated diene polymer having an average molecular weight between about 8,000 and about 60,000, and said blocks C comprise 60–90% by weight of each copolymer,
   (b) about 5 to about 200 parts by weight of a syndiotactic 1,2-polybutadiene;
   (c) about 9 to 50 parts by weight of a linear low density polyethylene;
   (d) about 0 to about 200 parts by weight of a hydrocarbon rubber extending oil; and
   (e) about 10 to about 50 parts by weight of a large agglomerate size filler.

2. The unit sole of claim 1 wherein said A and C blocks are polystyrene blocks and said B and C blocks are polybutadiene blocks.

* * * * *